United States Patent
Shukla et al.

(10) Patent No.: US 12,430,501 B2
(45) Date of Patent: Sep. 30, 2025

(54) AUTOMATICALLY GENERATING GRAPHIC DESIGN VARIANTS FROM INPUT TEXT

(71) Applicant: ADOBE INC., San Jose, CA (US)

(72) Inventors: Tripti Shukla, Uttar Pradesh (IN); Khyathi Vagolu, Hyderabad (IN); Sarthak Rout, Odisha (IN); Nakula Neeraje, Bangalore (IN); Akhash Nakkonda Amarnath, Chennai (IN); Balaji Vasan Srinivasan, Bangalore (IN)

(73) Assignee: ADOBE INC., San Jose, CA (US)

(*) Notice: Subject to any disclaimer, the term of this patent is extended or adjusted under 35 U.S.C. 154(b) by 378 days.

(21) Appl. No.: 18/052,693

(22) Filed: Nov. 4, 2022

(65) Prior Publication Data
US 2024/0152695 A1     May 9, 2024

(51) Int. Cl.
| | | |
|---|---|---|
| *G06F 40/186* | (2020.01) | |
| *G06F 16/56* | (2019.01) | |
| *G06F 40/295* | (2020.01) | |
| *G06F 40/56* | (2020.01) | |

(52) U.S. Cl.
CPC ............ *G06F 40/186* (2020.01); *G06F 40/56* (2020.01); *G06F 16/56* (2019.01); *G06F 40/295* (2020.01)

(58) Field of Classification Search
None
See application file for complete search history.

(56) References Cited

U.S. PATENT DOCUMENTS

| | | | |
|---|---|---|---|
| 11,610,054 B1* | 3/2023 | Aggarwal | G06F 40/30 |
| 2021/0209289 A1* | 7/2021 | Kandur Raja | G06F 40/109 |
| 2022/0121702 A1* | 4/2022 | Kale | G06N 3/04 |
| 2022/0237373 A1* | 7/2022 | Singh Bawa | G06N 20/00 |
| 2022/0261972 A1* | 8/2022 | Wang | G06F 18/24 |

(Continued)

OTHER PUBLICATIONS

Akshay Gadi Patil, Omri Ben-Eliezer, Or Perel, Hadar Averbuch-Elor "Read: Recursive Autoencoders for Document Layout Generation" arXiv:1909.00302v4 [cs.CV] Apr. 16, 2020 (Year: 2020).*

(Continued)

*Primary Examiner* — Richemond Dorvil
*Assistant Examiner* — Alexander G Marlow
(74) *Attorney, Agent, or Firm* — F. CHAU & ASSOCIATES, LLC

(57) ABSTRACT

Systems and methods for automatically generating graphic design documents are described. Embodiments include identifying an input text that includes a plurality of phrases; obtaining one or more images based on the input text; encoding an image of the one or more images in a vector space using a multimodal encoder to obtain a vector image representation; encoding a phrase from the plurality of phrases in the vector space using the multimodal encoder to obtain a vector text representation; selecting an image text combination including the image and the phrase by comparing the vector image representation and the vector text representation; selecting a design template from a plurality of candidate design templates based on the image text combination; and generating a document based on the design template, wherein the document includes the at least one image and the at least one phrase.

18 Claims, 14 Drawing Sheets

(56) References Cited

U.S. PATENT DOCUMENTS

| | | | | |
|---|---|---|---|---|
| 2022/0327282 A1* | 10/2022 | Schuck | ............... | G06F 40/186 |
| 2023/0237773 A1* | 7/2023 | Li | ............... | G06F 40/126 |
| | | | | 382/155 |
| 2024/0104809 A1* | 3/2024 | Yu | ............... | G06V 30/413 |

OTHER PUBLICATIONS

M. Guo, D. Huang and X. Xie, "The Layout Generation Algorithm of Graphic Design Based on Transformer-CVAE," 2021 International Conference on Signal Processing and Machine Learning (CONF-SPML), Stanford, CA, USA, 2021, pp. 219-224, doi: 10.1109/CONF-SPML54095.2021.00049. (Year: 2021).*

Shunan Guo, Zhuochen Jin, Fuling Sun, Jingwen Li, Zhaorui Li, Yang Shi, and Nan Cao. 2021. Vinci: An Intelligent Graphic Design System for Generating Advertising Posters. In Proceedings of the 2021 CHI Conference on Human Factors in Computing Systems (CHI '21). https://doi.org/10.1145/3411764.3445117 (Year: 2021).*

1Gupta, et al., "Layout Transformer: Layout Generation and Completion with Self-attention", arXiv preprint arXiv:2006.14615v2 [cs.CV] Jun. 25, 2020, 57 pages.

2Li, et al., "LayoutGAN: Generating Graphic Layouts with Wireframe Discriminators", arXiv preprint arXiv:1901.06767v1 [cs.CV] Jan. 21, 2019, 16 pages.

3Zheng, et al., "Content-aware Generative Modeling of Graphic Design Layouts", ACM Trans. Graph., vol. 38, No. 4, Article 133, Publication date: Jul. 2019, 15 pages.

4Guo, et al., "Vinci: An Intelligent Graphic Design System for Generating Advertising Posters", CHI '21, May 8-13, 2021, Yokohama, Japan, 17 pages.

5Grootendorst. "KeyBERT: Minimal keyword extraction with BERT", https://doi.org/10.5281/zenodo.4461265. 2020.

6FigTag Model. https://www.figma.com/community/plugin/998914249119019489/Figtag. 2023.

* cited by examiner

AUTOMATICALLY GENERATING GRAPHIC DESIGN VARIANTS FROM INPUT TEXT

BACKGROUND

The following relates generally to data processing, and more specifically to automatically generating designs. Graphic design, as defined by the American Institute of Graphic Arts, is "the art of planning and projecting ideas and experiences with visual and textual content." Graphic design is frequently used to engage the attention of others. For example, graphic design is applied to the generation of advertising content, event invitations, and showcases of products. Creating graphic designs, however, can be tedious and overwhelming for inexperienced creators, as the process involves a nuanced understanding of the various inputs and available design elements, as well as making design choices that link the elements together.

Illustrator-type programs can provide design templates for a creator to use based on input queries. However, the templates typically only provide a starting point, and leave multiple design choices for the creator. Furthermore, the available templates may not follow a user's previous designs, which can lead to a lack of consistency in a marketing campaign or an inability for the creator to adhere to brand guidelines. Thus, there is a need in the art for systems and methods to generate full designs based on an input text, with the optional capability to influence the generated designs from prior designs.

SUMMARY

The present disclosure describes systems and methods for automatically generating graphic designs. Embodiments include an end-to-end pipeline to automatically generate graphic design variants using an input text. Some embodiments further receive a collection of prior designs from a user, and extract elements such as logos, color palettes, and fonts for use in the target designs. Users may additionally provide images to be included in the target designs. In some cases, embodiments additionally retrieve images from a database based on the input text.

A method, apparatus, non-transitory computer readable medium, and system for automatically generating designs are described. One or more aspects of the method, apparatus, non-transitory computer readable medium, and system include identifying an input text that includes a plurality of phrases; obtaining one or more images based on the input text; encoding an image of the one or more images in a vector space using a multimodal encoder to obtain a vector image representation; encoding a phrase from the plurality of phrases in the vector space using the multimodal encoder to obtain a vector text representation; selecting an image text combination including the image and the phrase by comparing the vector image representation and the vector text representation; selecting a design template from a plurality of candidate design templates based on the image text combination; and generating a document based on the design template, wherein the document includes the at least one image and the at least one phrase.

An apparatus, system, and method for automatically generating designs are described. One or more aspects of the apparatus, system, and method include a non-transitory computer-readable medium comprising instructions executable by a processor to: identify an input text and one or more images; identify a common element from a plurality of prior documents; select an image text combination including at least one image of the one or more images and at least one phrase of the input text by comparing a vector representation of the at least one image and a vector representation of the at least one phrase; selecting a design template from a plurality of candidate design templates based on the image text combination; and generating a document based on the design template, wherein the document includes the at least one image, the at least one phrase, and the common element. One or more aspects of the apparatus, system, and method include extracting one or more common elements from the plurality of prior documents, wherein the one or more common elements comprise a text element, a logo, a color palette, a font, or any combination thereof.

An apparatus, system, and method for automatically generating designs are described. One or more aspects of the apparatus, system, and method include a processor, and a memory storing instructions executable by the processor to: identify an input text that includes a plurality of phrases; retrieve, by an image retrieval component, one or more images based on the input text; select, by a combination component, an image text combination including at least one image of the one or more images and at least one phrase of the plurality of phrases by comparing a vector image representation of the at least one image and a vector text representation of the at least one phrase; select, by a template component, a design template from a plurality of candidate design templates based on the image text combination; and generate, by a document generation component, a document based on the design template, wherein the document includes the at least one image and the at least one phrase. In some aspects, the combination component comprises a multimodal encoder.

In one or more aspects, the image retrieval component is configured to retrieve a plurality of images from a database based on an input text. In one or more aspects, the instructions are further executable to generate the at least one phrase based on an input text using a natural language processing (NLP) component. In one or more aspects, the instructions are further executable to extract a plurality of entities from an input text using a named entity recognition component (NER) component. In one or more aspects, the instructions are further executable to extract one or more common elements from a plurality of prior documents using an element extraction component.

DETAILED DESCRIPTION

Figure 1:
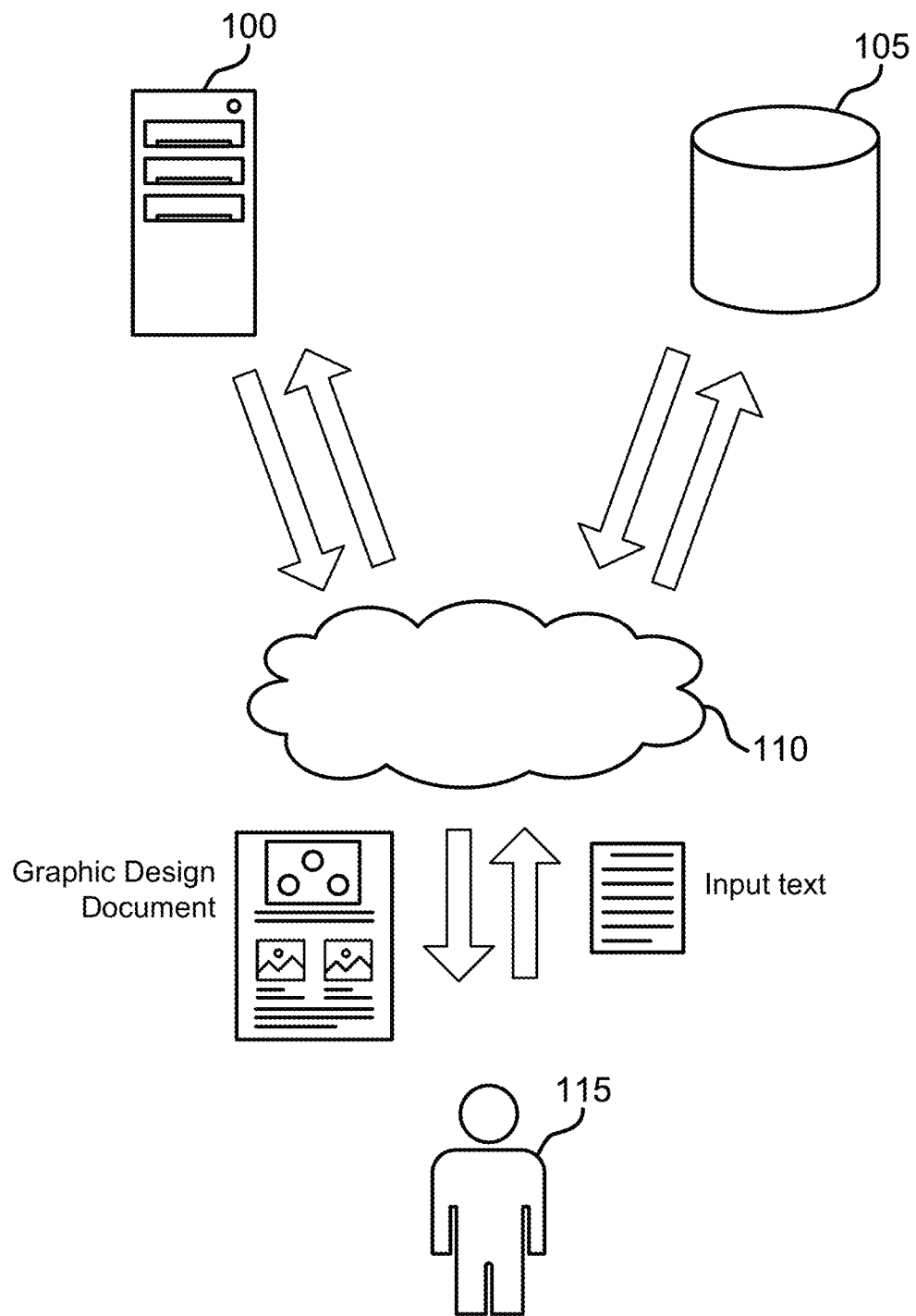
FIG. 1 shows an example of a design generation system according to aspects of the present disclosure.

Creating graphic designs involves identifying text content, image content, and design elements, and arranging them in an aesthetically pleasing manner. In many cases, a user is supplied with a description of an event or product, and is tasked with creating a target graphic design based on the description. Often, this leaves the choice of supplementary images, fonts, logos, slogans, and other design elements up to the user.

Illustrator, word processor, and CAD software applications assist users in creating graphic designs by providing a variety of templates. For example, these programs can retrieve templates based on input queries. Users can search for layout types, such as "birthday card", "poster", "tri-fold", and the like, as well as thematic types such as "beach", "forest", etc. While this breadth of choice provides many options for starting points for a user, there are some drawbacks.

The starting point templates do not place any text for the user with the exception of occasional boilerplate fields. The user must decide whether to partition the description of the event or product, or to generate additional language content. Further, the starting point templates often do not provide images that are relevant to the starting description. Also, while the templates may include fonts and color palettes that are adjustable, the user is left to match these design elements with prior designs, which may be difficult for users who are unaware of the names of these elements and color palettes.

Some systems for generating design layouts include transformer-based frameworks configured to fill out an incomplete layout based on input elements. Other systems use a GAN-based framework to reshuffle design elements from input layers to generate alternate arrangements. However, both approaches do not use the semantic information from an input text to retrieve images, generate new phrases, or generate image text combinations. Accordingly, such systems are unable to generate full target designs based on the input text.

Embodiments of the present disclosure generate full target designs based on a text description. Accordingly, embodiments of the present disclosure provide an improvement to design generation platforms by enabling the generation of a complete design, including layout, text content, and image content. In some embodiments, the text and image content is generated using a generative neural network. The designs include assets that are based on the input text, or chosen based on a high semantic coherence with the input text. Further, the templates used in the final design are compatible with the number and size of the assets. Accordingly, embodiments provide final design variants with salient content based on one input text, reducing the number of decisions and time used by a creator.

The text description may be an end-user facing description for an event, an item, or the like. Embodiments use the input text to generate or retrieve several aspects for the target design, including selected phrases from the input text, new phrases, images, and layout. Additionally, some embodiments are configured to leverage prior designs for design elements such as fonts, color palettes, logos, and the like. For example, some embodiments use computer vision techniques or deep learning models to process images containing the prior designs to extract common design elements.

To generate a target design document from an input text, embodiments apply natural language processing to the input text to separate the text into a plurality of phrases, or generate new phrases based on the input text. Then, embodiments retrieve one or more images based on the phrases, such as from a database or from a set of images identified by the user. The system then generates image text combinations that include the text phrases and the images. The system then retrieves design templates based on the image text combinations. For example, the system may retrieve templates that are compatible with properties of the generated image text combinations, such as the size or shape of the images, the number of texts, etc.

In embodiments, a combination component generates bounding boxes for the assets in the image text combinations, and a template component retrieves templates that are compatible with the bounding boxes. In at least one embodiment, the templates retrieved include fields such that the image text combinations are matched 1:1 with the fields. In some cases, the image text combinations are ranked or filtered based on a semantic coherence between the text phrases and the images. The semantic coherence can be determined by embedding the text and the images into a common space and comparing the embeddings.

As used herein, an "image text combination" refers to a combination of images and text phrases generated by the system. The image text combinations are used to provide compatible design templates, and then inserted into the design templates to generate a final target design document, or variants thereof. Embodiments ensure a "semantic coherence" between the images and phrases in the image text combination by embedding the images and texts into a common space, and comparing the embeddings.

A 'document' as used herein refers to a completed design, such as a target design generated by the system or a prior design provided by the user. The document may be in the style of a poster, a tri-fold, a 16:9 image, or any format identified by a user.

Details regarding the architecture of a design generation system and various generation pipelines are provided with reference to FIGS. 1-6. Methods for generating graphic designs are described with reference to FIGS. 7-9. Methods for leveraging prior designs for document generation are described with reference to FIGS. 10-11. A training process for a generative language model is described with reference to FIG. 12. A computing device designed to implement a design generation apparatus is described with reference to FIG. 13.

Design Generation System

An apparatus for automatically generating designs is described. One or more aspects of the apparatus include a processor, and a memory storing instructions executable by the processor to: identify an input text that includes a plurality of phrases; retrieve, by an image retrieval component, one or more images based on the input text; select, by a combination component, an image text combination including at least one image of the one or more images and at least one phrase of the plurality of phrases by comparing a vector image representation of the at least one image and a vector text representation of the at least one phrase; select, by a template component, a design template from a plurality of candidate design templates based on the image text combination; and generate, by a document generation component, a document based on the design template, wherein the document includes the at least one image and the at least one phrase. According to same aspects, the apparatus further includes image retrieval component configured to retrieve a plurality of images from a database based on an input text. In some aspects, the combination component comprises a multimodal encoder.

In some aspects, the instructions are further executable to generate the at least one phrase based on the input text using a natural language processing (NLP) component. In some aspects, the instructions are further executable to extract a plurality of entities from the input text using a named entity recognition component (NER) component. In some aspects, the instructions are further executable to extract one or more common elements from a plurality of prior documents using an element extraction component.

FIG. 1 shows an example of a design generation system according to aspects of the present disclosure. The example shown includes design generation apparatus 100, database 105, network 110, and user 115.

In an example process, user 115 provides an input text to design generation apparatus 100 through a user interface. Design generation apparatus 100 then processes the input text, retrieves images from database 105, and generates a graphic design document containing representative of the input text. Then, design generation apparatus 100 provides the document to user 115 through, for example, the user interface.

One or more components of design generation apparatus 100 may be implemented on a server, or multiple servers connected through network 110. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

An embodiment of a design generation system includes database 105. In some examples, the system stores clip-art images, realistic images, logos, fonts, templates, deep learning model parameters, training data, and other information on a database. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, user 115 interacts with the database controller. In other cases, the database controller may operate automatically without user interaction. Database 105 is an example of, or includes aspects of, the corresponding element described with reference to FIGS. 4 and 9.

Network 110 facilitates the transfer of information between user 115, database 105, and design generation apparatus 100. Network 110 can be referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
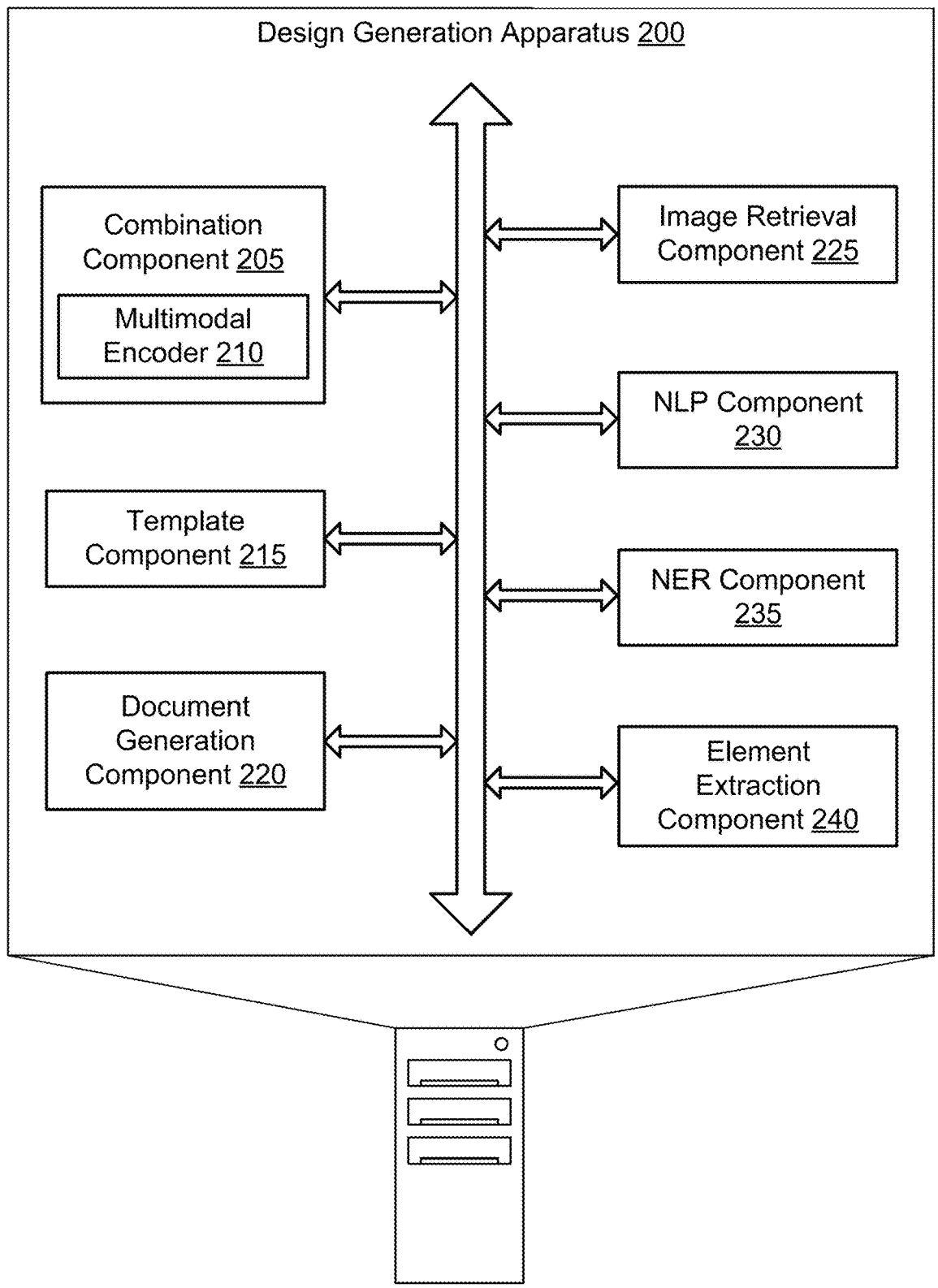
FIG. 2 shows an example of a computing device for design generation according to aspects of the present disclosure.

FIG. 2 shows an example of a design generation apparatus 200 according to aspects of the present disclosure. The example shown includes design generation apparatus 200, combination component 205, template component 215, document generation component 220, image retrieval component 225, natural language processing (NLP) component 230, named entity recognition (NER) component 235, and element extraction component 240.

Design generation apparatus 200 includes several components. The term 'component' is used to partition the functionality enabled by the processors and the executable instructions included in the computing device used to implement design generation apparatus 200 (such as the computing device described with reference to FIG. 13). The partitions may be implemented physically, such as through the use of separate circuits or processors for each component, or may be implemented logically via the architecture of the code executable by the processors.

Combination component 205 is used to generate image text combinations from a set of images and a set of texts. Embodiments of combination component 205 include multimodal encoder 210 that encodes the images and texts to a common space, and is configured to compare the images and text in the space (using, e.g., cosine similarity) to create combinations with assets that are semantically similar to each other. In some examples, multimodal encoder 210 includes a CLIP encoder.

A Contrastive Language-Image Pre-training (CLIP), is a contrastive learning model trained for image representation learning using natural language supervision. CLIP jointly trains an image encoder and a text encoder to predict the correct pairings of a batch of (image, text) training examples. The trained text encoder synthesizes a zero-shot linear classifier by embedding the names or descriptions of the target dataset's classes.

For pre-training, CLIP is trained to predict which of the possible (image, text) pairings across a batch actually occurred. CLIP learns a multi-modal embedding space by jointly training an image encoder and text encoder to maximize the cosine similarity of the image and text embeddings of the real pairs in the batch while minimizing the cosine similarity of the embeddings of the incorrect pairings. A symmetric cross entropy loss is optimized over these similarity scores.

In some examples, combination component 205 generates a set of image text combinations. In some examples, combination component 205 computes similarity scores for each of the set of image text combinations, respectively. The similarity scores may be computed using, for example, a cosine similarity between embeddings of the images and embeddings of text phrases. In some examples, combination component 205 selects a subset of the set of image text combinations based on the similarity scores. In some examples, combination component 205 identifies a number of images and a number of phrases in the image text combination, where the design template used for the target document is selected based on the number of images and the number of phrases.

According to some aspects, combination component 205 selects an image text combination including at least one image and at least one phrase by comparing a vector image representation of the at least one image and a vector text representation of the at least one phrase. In at least one embodiment, an image text combination may include only images or only texts. In some examples, combination component 205 identifies a combination of entities from a set of entities produced by NER component 235, where the one or more images are retrieved based on the combination of entities. In some examples, combination component 205 computes a similarity score for the image text combination based on the vector image representation and the vector text representation, where the image text combination is selected based on the similarity score.

Template component 215 is used to retrieve templates from a template database that are compatible with the image text combinations provided by combination component 205. Template component 215 may query a database, such as the one described with reference to FIG. 1, for the templates.

Document generation component 220 arranges the assets generated from the other components into a graphic design document. For example, document generation component 220 inserts image text combinations generated from combination component 205 into the template retrieved by template component 215. In some embodiments, document generation component 220 generates several documents to provide design variants to the user.

In some examples, document generation component 220 replaces at least one image or at least one phrase with an additional content element based on input from the user. According to some aspects, document generation component 220 generates a document based on the design template, where the document includes the at least one image, the at least one phrase, and a common element from prior designs.

Image retrieval component 225 is used to retrieve images based on queries created from an input text. For example, the queries may be phrases including both segments generated by NER component 235 and slogans generated by NLP component 230. In some examples, image retrieval component 225 queries a database as described with reference to FIG. 1. Image retrieval component 225 is an example of, or includes aspects of, the corresponding element described with reference to FIG. 4.

NLP component 230 is used to generate slogans from the input text using NLP techniques. Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers. Embodiments of NLP component 230 include a pre-trained neural language model such as GPT-2 or GPT-3. Additional detail regarding NLP component 230 will be provided with reference to FIG. 3.

NER component 235 uses named entity recognition techniques (NER) to process input text into text segments. In some examples, the text segments consist of 1-8 words. NER techniques are used to classify words in a string of unstructured text to extract information from the text. NER techniques include both rule-based and statistical models for classification.

According to some aspects, NER component 235 segments input text to obtain a set of phrases. In some examples, NER component 235 extracts a set of entities from the input text using an NER model to form text segments, where the one or more images are retrieved based on the text segments. NER component 235 is an example of, or includes aspects of, the corresponding element described with reference to FIGS. 3 and 4.

Element extraction component 240 is used to extract common elements from a set of prior designs. Some examples of element extraction component 240 include several machine learning models configured to extract various elements common to a set of prior designs, such as logos, fonts, and color palettes.

According to some aspects, element extraction component 240 extracts one or more common elements from the set of prior documents, where the one or more common elements include a text element, a logo, a color palette, a font, or any combination thereof.

Element extraction component 240 is an example of, or includes aspects of, the corresponding element described with reference to FIG. 11. Additional detail regarding element extraction component 240 will be provided with reference to FIG. 11.

Figure 3:
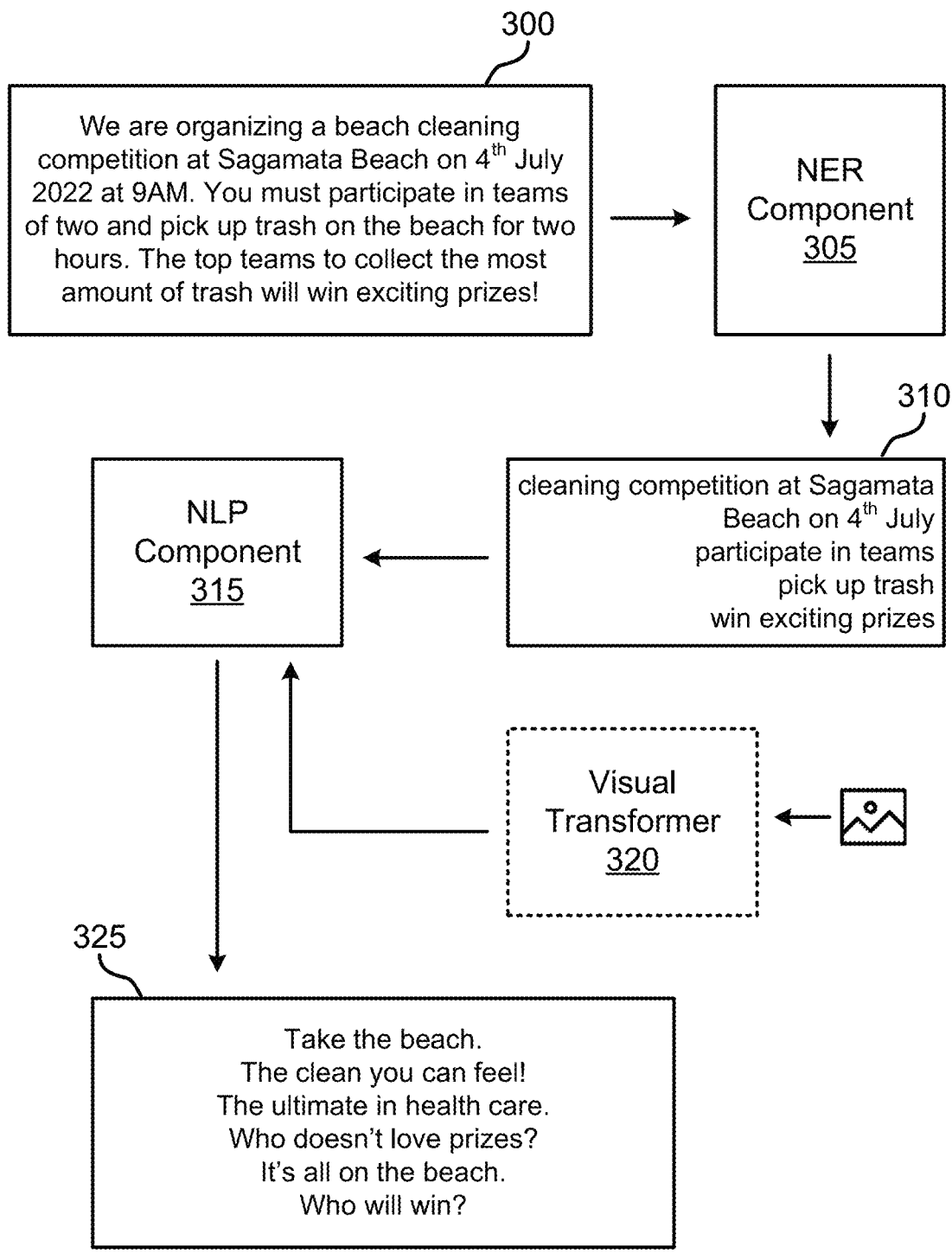
FIG. 3 shows an example of a pipeline for slogan generation according to aspects of the present disclosure.

FIG. 3 shows an example of a pipeline for slogan generation according to aspects of the present disclosure. The example shown includes input text 300, NER component 305, text segments 310, NLP component 315, visual transformer 320, and slogans 325. Input text 300 is an example of, or includes aspects of, the corresponding element described with reference to FIGS. 4 and 5. NER component 305 is an example of, or includes aspects of, the corresponding element described with reference to FIGS. 2 and 4. NLP component 315 is an example of, or includes aspects of, the corresponding element described with reference to FIG. 2. Slogans 325 is an example of, or includes aspects of, the corresponding element described with reference to FIG. 6.

Embodiments divide input text 300 into text segments 310. Segments from the original text may include factual information that the user wants to convey through the final design. In some examples, embodiments extract text segments (e.g., segments of 1-8 words in length) using NER component 305.

Embodiments of NER component 305 include a transformer model, such as KeyBERT, which computes cosine similarity between BERT embeddings of text strings. In some examples, the cosine similarity is used to identify text of various lengths that are most similar to the input text description to generate a set of segments. Some embodiments further perform maximal margin relevance (MMR) based filtering to select representative segments from the set of segments. For example, the MMR filtering may be used to diversify the segments and avoid repetition. Additionally, embodiments may parse and add dates and locations of the event to a set of keywords.

In addition to the segments from the original text, embodiments further generate slogans 325 for the target design. The segments and the slogans form the set of phrases that will be combined with images to form image text combinations that are used in the target design.

Slogans are short and catchy taglines used in advertising, and are effective in obtaining attention of the audience and making the graphic designs memorable. In some examples, brands use slogans to establish a connection between a product and a consumer. NLP component 315 is configured to generate slogans suitable for the theme of a target design based on input text. Some examples of NLP component 315 include generative language model that includes a trained transformer model such as GPT-2 to generate the slogans. The model is pre-trained on a collection of slogans from various brands (e.g., marketing and advertising slogans, mottos, taglines dataset, etc.) primed on textual descriptions. In some embodiments, the NLP component generates the slogans using segments from the input text, as using the entire input text description may not be relevant for generating slogans. In some cases, a threshold number of slogans 325 are chosen for the final design based on a semantic relevancy to the input text.

Additionally, some embodiments include a visual transformer network ViT to work with the generative language model in generating slogans that are related to the retrieved images. For example, visual transformer 320 may encode retrieved images into an embedding that is used as additional input to NLP component 315. In such cases, NLP component 315 includes a decoder configured to decode representations from visual transformer 320 into slogans. This allows the system to generate slogans based on images.

Figure 4:
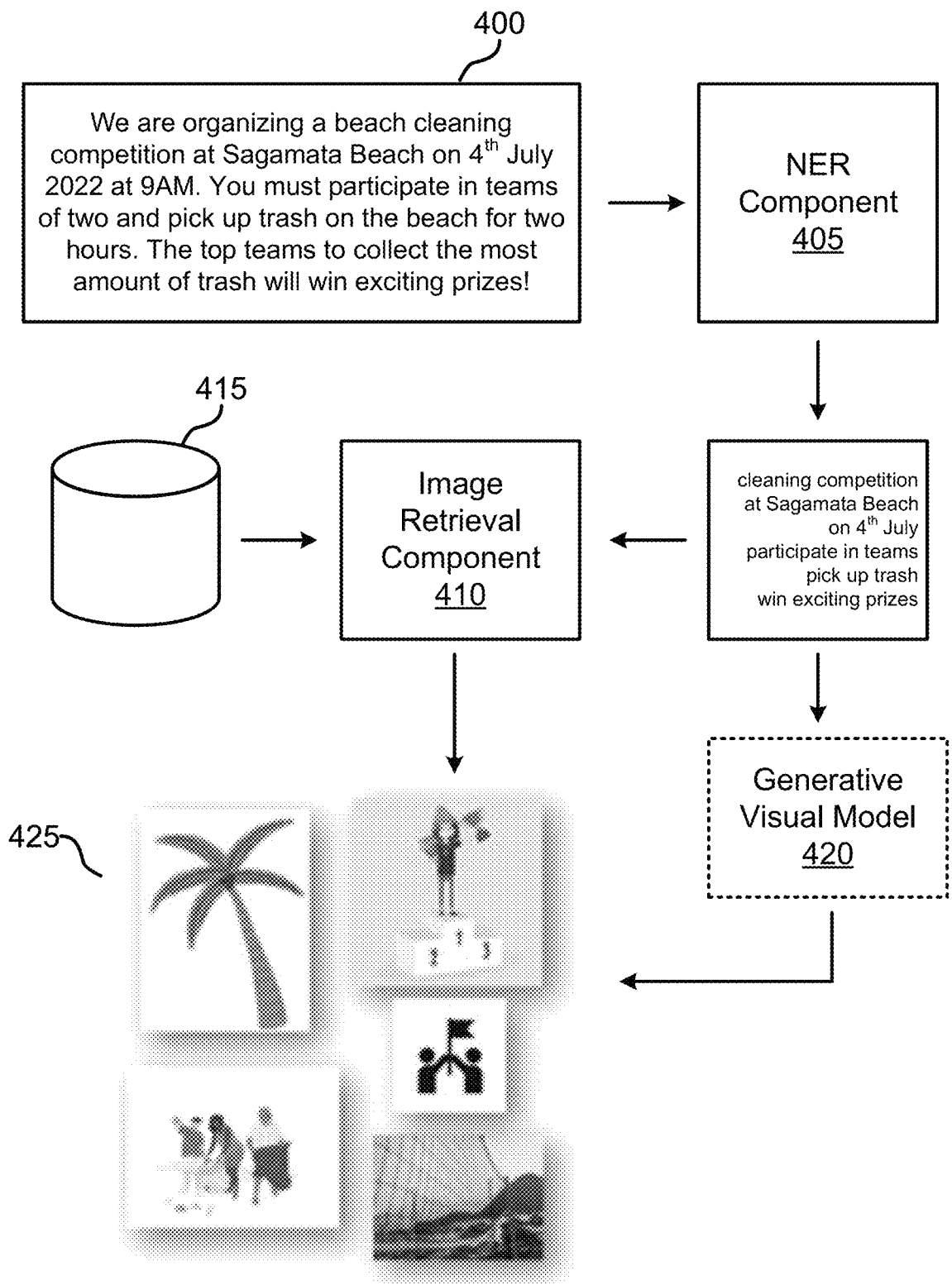
FIG. 4 shows an example of a pipeline for image retrieval according to aspects of the present disclosure.

FIG. 4 shows an example of a pipeline for image retrieval according to aspects of the present disclosure. The example shown includes input text 400, NER component 405, image retrieval component 410, database 415, generative visual model 420, and images 425. Input text 400 is an example of, or includes aspects of, the corresponding element described with reference to FIGS. 3 and 5. NER component 405 is an example of, or includes aspects of, the corresponding element described with reference to FIGS. 2 and 3.

Image retrieval component 410 is an example of, or includes aspects of, the corresponding element described with reference to FIG. 2. Database 415 is an example of, or includes aspects of, the corresponding element described with reference to FIGS. 1 and 8.

Graphic designs include both text and images to convey an intended message. Accordingly, in addition to processing the input text description to generate phrases (e.g., segments and slogans), embodiments retrieve images that are salient to the content from the input text. For example, embodiments include image retrieval component 410 configured to retrieve images from an image database that includes stock images, such as database 415. In some embodiments, the stock images are labeled with key terms. In some embodiments, a trained network such as a ViT is used to extract semantic information from a corpus of images, so that the design generation system can query the database using language information. In some embodiments, encodings of text phrases are used as the query to database 415, and images 425 are retrieved based on a similarity between the encoded query and encoded images.

Some embodiments further apply MMR based reranking to balance query relevance and diversity of images that are retrieved when querying a large dataset. In some cases, the reranking method is applied to the phrase queries produced by NER component 405 to provide a diverse set of queries and ensure that the images retrieved are diverse (i.e., not redundant). Some embodiments include separate databases or separate sets of images for clip-art type images and natural photos. In such cases, the datasets can be queried separately for the clip-arts and natural photos.

Images for the target design can be provided by the user or retrieved from a database, as discussed above. The images are not limited to these sources, however. For example, some embodiments may additionally generate novel images through the use of a generative model such as a diffusion model. For example, an embodiment of the design generation apparatus additionally includes generative visual model 420 that includes a latent diffusion model. Generative visual model 420 may receive embeddings of the images or phrases included in the image text combinations, and the generative process using the latent diffusion model may be conditioned on those embeddings.

Diffusion models are a class of generative neural networks which can be trained to generate new data with features similar to features found in training data. In particular, diffusion models can be used to generated novel images. Diffusion models work by iteratively adding noise to the data during a forward process and then learning to recover the data by denoising the data during a reverse process. For example, a diffusion model can take an original image as input and repeatedly add Gaussian noise to the image until the image resembles pure noise. Next, the diffusion model gradually removes the noise from the noisy image to generate a new version of the original image. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

In some examples, diffusion models are based on a convolutional neural network (CNN) architecture known as a U-Net. The U-Net includes a first set of convolutional layers separated by down-sampling layers and a corresponding second set of convolutional layers separated by upsampling layers. The first set of layers are connected to the second set of layers by skip connections. In some cases, diffusion models also include cross-attention layers between the convolutional layers.

According to some embodiments, a guidance process (for example, generating images based on textual descriptions) can be applied to train a diffusion model to generate images in various conditional settings. Thus, in addition to the forward process and the reverse process, the diffusion models can include a conditioning process. In an example of a conditioning process, the diffusion model takes the guidance, for example, a semantic map or a text description, as input and generates vector representations based on the input. Next, the diffusion model generates an image based on the vector representations. In some cases, the image is concatenated with latent code at a noisy timestep to generate a new input for the reverse process. Though these methods, generative visual model 420 generates additional images for use in a target design.

Figure 5:
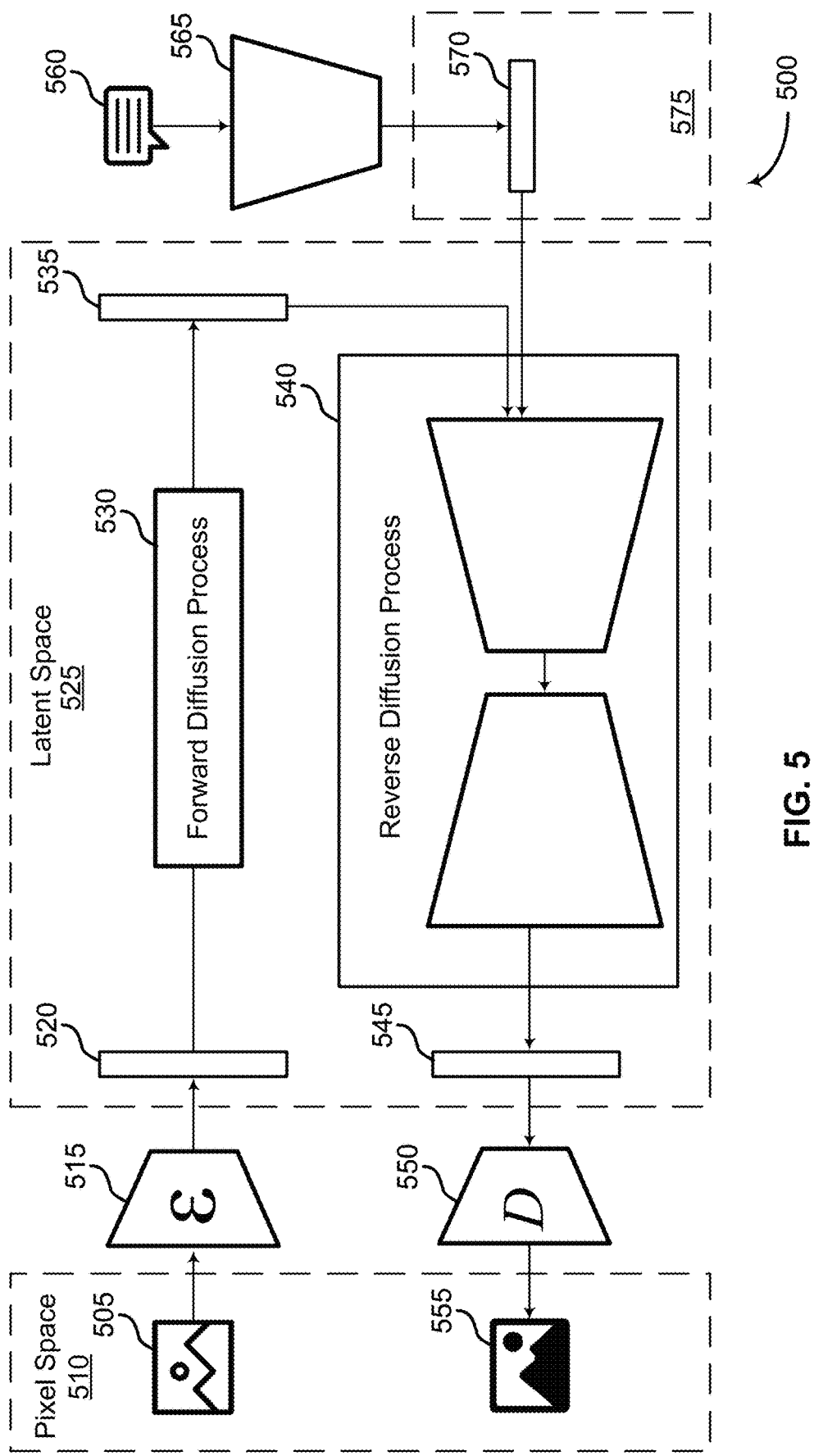
FIG. 5 shows an example of a guided latent diffusion model according to aspects of the present disclosure.

FIG. 5 shows an example of a guided latent diffusion model 500 according to aspects of the present disclosure. The guided latent diffusion model 500 depicted in FIG. 5 is an example of, or includes aspects of, the generative visual model described with reference to FIG. 4.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 500 may take an original image 505 in a pixel space 510 as input and apply image encoder 515 to convert original image 505 into original image features 520 in a latent space 525. Then, a forward diffusion process 530 gradually adds noise to the original image features 520 to obtain noisy features 535 (also in latent space 525) at various noise levels.

Next, a reverse diffusion process 540 (e.g., a U-Net ANN) gradually removes the noise from the noisy features 535 at the various noise levels to obtain denoised image features 545 in latent space 525. In some examples, the denoised image features 545 are compared to the original image features 520 at each of the various noise levels, and parameters of the reverse diffusion process 540 of the diffusion model are updated based on the comparison. Finally, an image decoder 550 decodes the denoised image features 545 to obtain an output image 555 in pixel space 510. In some cases, an output image 555 is created at each of the various noise levels. The output image 555 can be compared to the original image 505 to train the reverse diffusion process 540.

In some cases, image encoder 515 and image decoder 550 are pre-trained prior to training the reverse diffusion process 540. In some examples, they are trained jointly, or the image encoder 515 and image decoder 550 and fine-tuned jointly with the reverse diffusion process 540.

The reverse diffusion process 540 can also be guided based on a text prompt 560, or another guidance prompt, such as an image, a layout, a segmentation map, etc. The text prompt 560 can be encoded using a text encoder 565 (e.g., a multimodal encoder) to obtain guidance features 570 in guidance space 575. The guidance features 570 can be combined with the noisy features 535 at one or more layers of the reverse diffusion process 540 to ensure that the output image 555 includes content described by the text prompt 560. For example, guidance features 570 can be combined with the noisy features 535 using a cross-attention block within the reverse diffusion process 540.

Figure 6:
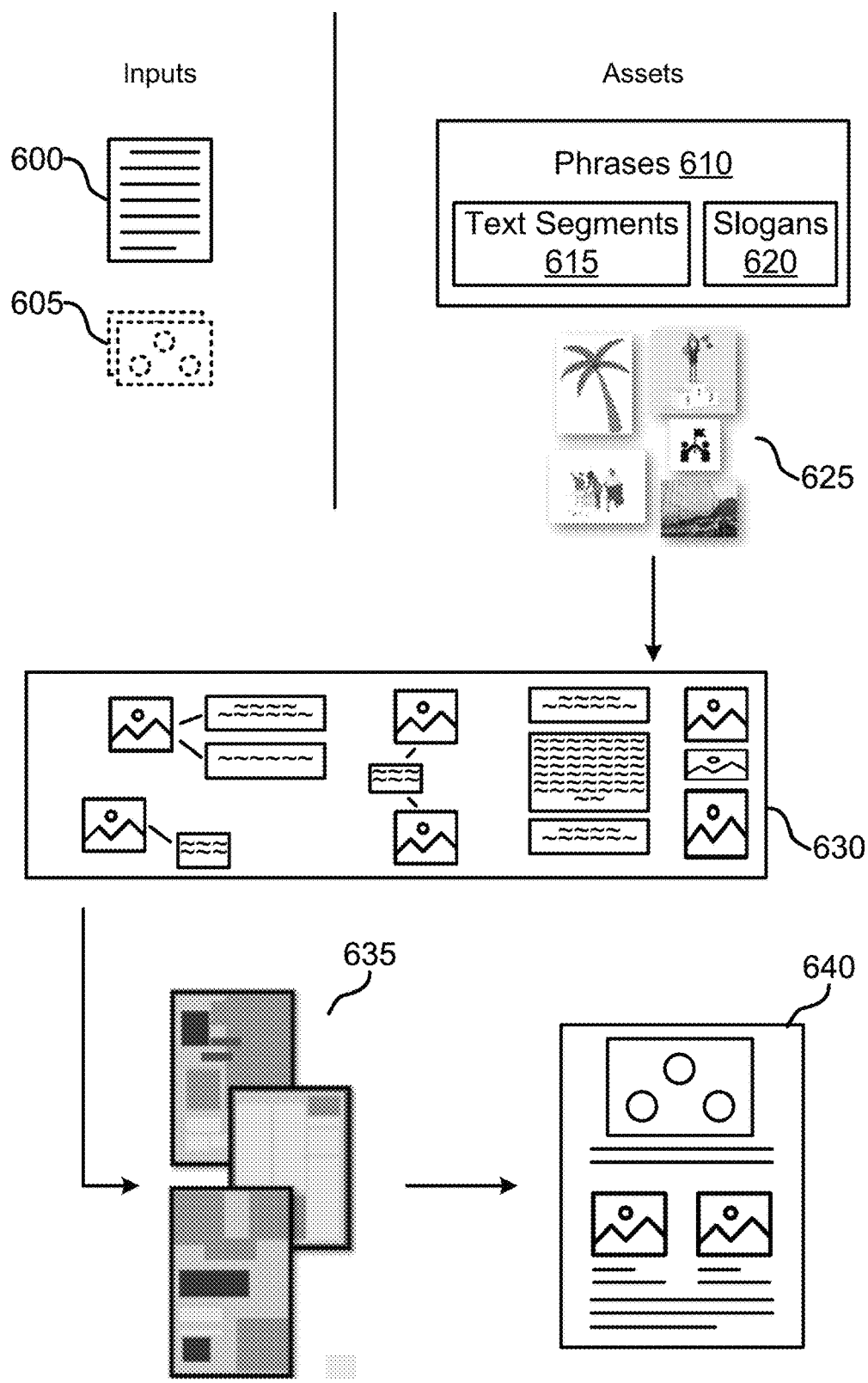
FIG. 6 shows an example of a pipeline for document generation according to aspects of the present disclosure.

FIG. 6 shows an example of a pipeline for document 640 generation according to aspects of the present disclosure. The example shown includes input text 600, input images 605, phrases 610, text segments 615, slogans 620, images 625, image text combinations 630, candidate design templates 635, and document 640.

Input text 600 is an example of, or includes aspects of, the corresponding element described with reference to FIGS. 3 and 4. Phrases 610 is an example of, or includes aspects of, the corresponding element(s) described with reference to FIG. 9. Slogans 620 is an example of, or includes aspects of, the corresponding element(s) described with reference to FIG. 3. Images 625 is an example of, or includes aspects of, the corresponding element(s) described with reference to FIGS. 4 and 9. Image text combinations 630 is an example of, or includes aspects of, the corresponding element(s) described with reference to FIG. 9.

The pipeline illustrated in FIG. 6 omits some components discussed above to avoid redundancy. To the extent that a component's description is omitted, it will be appreciated that the description for similar components may be found elsewhere throughout the specification.

A design generation system receives input text 600, and in some cases, input images 605. The system generates assets from the inputs, including phrases 610 and images 625. Phrases 610 includes text segments 615 generated by an NER component, and slogans 620 generated by an NLP component. Images 625 are generated by an image retrieval component as discussed above, and may additionally include input images 605, and images generated from a generative visual model such as the one described with reference to FIG. 5. Images 625 may be retrieved using queries based on text segments 615 or slogans 620.

Once the assets are gathered, the system generates image text combinations 630 using a combination component as described with reference to FIG. 2. Embodiments of the combination component use a multimodal encoder that encodes the images and texts to a common space, and compares the images and text in the space (using, e.g., cosine similarity) to create image text combinations 630 with assets that are semantically similar to each other.

A layout retrieval component as described with reference to FIG. 2 uses image text combinations 630 to query a template database and produce candidate design templates 635. The layout retrieval component may retrieve templates based on properties of image text combinations 630, such as the size or aspect ratios of the images, the amount of text in each combination, and the like. The templates may be retrieved based on their compatibility with these properties. Additional detail regarding layout retrieval will be provided with reference to FIG. 9.

Finally, the system generates and provides document 640 to a user. Document 640 includes a template from candidate design templates 635, as well as some or all of the image text combinations 630. In some embodiments, the system generates several documents 640 as design variants and provides them to the user. In at least one embodiment, the template for document 640 is chosen based on a similarity between CLIP embeddings of images 625 and the embedding of the template.

Generating Graphic Designs

A method for automatically generating designs is described. One or more aspects of the method include identifying an input text that includes a plurality of phrases; retrieving one or more images based on the input text; selecting an image text combination including at least one image of the one or more images and at least one phrase of the plurality of phrases by comparing a vector image representation of the at least one image and a vector text representation of the at least one phrase; selecting a design template from a plurality of candidate design templates based on the image text combination; and generating a document based on the design template, wherein the document includes the at least one image and the at least one phrase. Some examples of the method, apparatus, non-transitory computer readable medium, and system further include identifying a number of images and a number of phrases in the image text combination, wherein the design template is selected based on the number of images and the number of phrases.

Some examples of the method, apparatus, non-transitory computer readable medium, and system further include segmenting the input text to obtain the plurality of phrases. Some examples further include generating an additional phrase using a generative natural language processing (NLP) model, wherein the document includes the additional phrase. Some examples further include extracting a plurality of entities from the input text using a named entity recognition (NER) model, wherein the one or more images are retrieved based on the plurality of entities.

Some examples of the method, apparatus, non-transitory computer readable medium, and system further include identifying a combination of entities from the plurality of entities, wherein the one or more images are retrieved based at least in part on the combination of entities. Some examples further include receiving an additional image from a user, wherein the document includes the additional image.

Some examples of the method, apparatus, non-transitory computer readable medium, and system further include encoding the at least one image in a vector space using a multimodal encoder to obtain the vector image representation. Some examples further include encoding the at least one phrase in the vector space using the multimodal encoder to obtain the vector text representation.

Some examples further include computing a similarity score for the image text combination based on the vector image representation and the vector text representation, wherein the image text combination is selected based on the similarity score. Some examples further include generating a plurality of image text combinations. Some examples further include computing similarity scores for each of the plurality of image text combinations, respectively. Some examples further include selecting a subset of the plurality of image text combinations based on the similarity scores.

Some examples further include generating a new document based on the design template. Some examples further include inserting the at least one image and the at least one phrase into the new document to obtain the document. Some examples of the method, apparatus, non-transitory computer readable medium, and system further include displaying the document to a user.

Some examples further include displaying an additional content element to the user. Some examples further include receiving an input from the user to replace the at least one image or the at least one phrase with the additional content element. Some examples further include replacing the at least one image or the at least one phrase with the additional content element based on the input.

Figure 7:
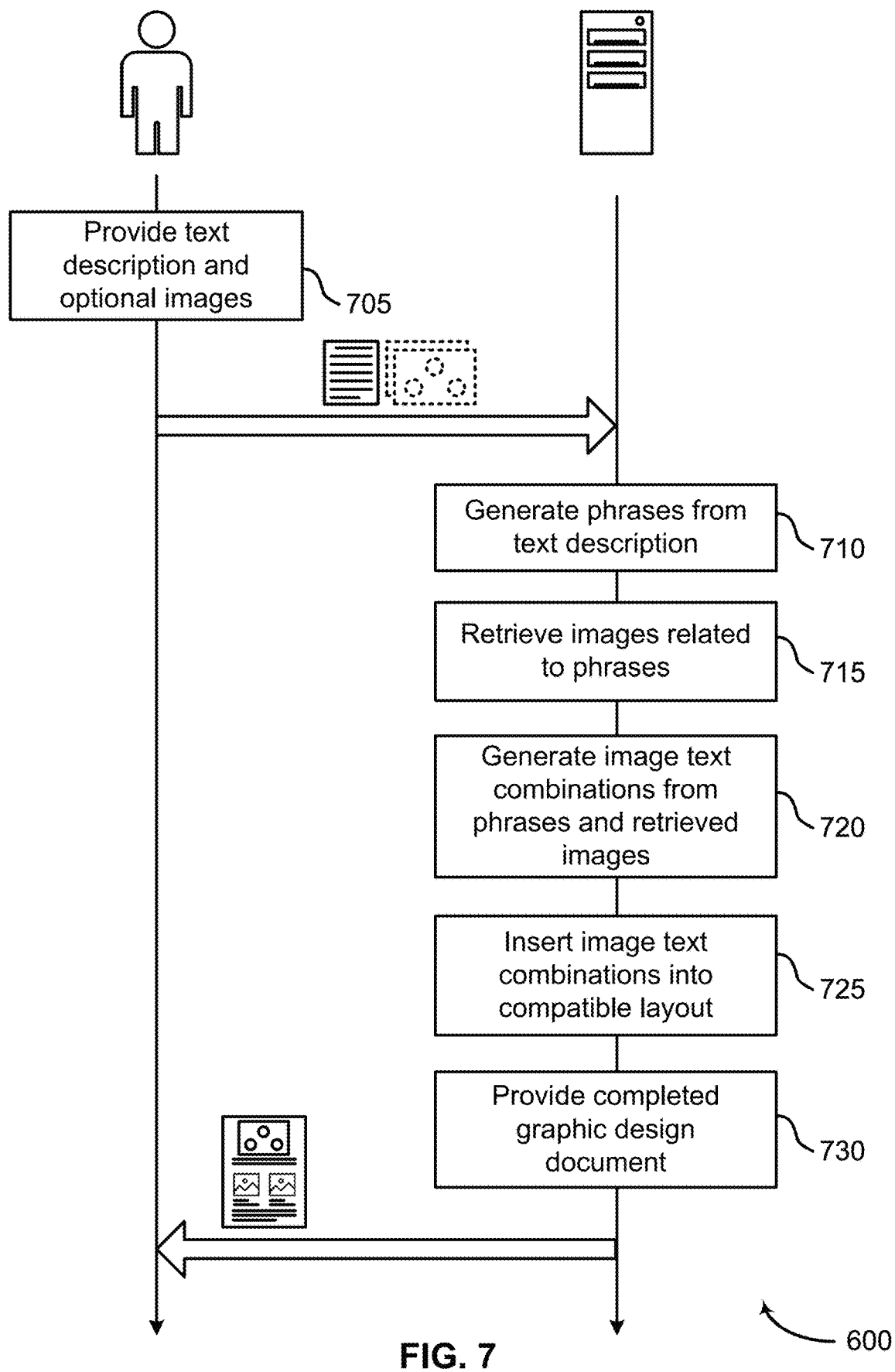
FIG. 7 shows an example of a method for providing a graphic design document to a user according to aspects of the present disclosure.

FIG. 7 shows an example of a method 700 for providing a graphic design document to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the user provides a text description as input. In some cases, the user additionally provides images to be included in a final design. The user may do so through, for example, user interface components of the system as described with reference to FIG. 2.

At operation 710, the system generates phrases from the text description. In some cases, this operation includes using an NER component of the system to perform named entity recognition on the input to text to generate text segments as described with reference to FIG. 3. This operation may additionally include using an NLP component of the system to generate slogans from the text segments. The NLP component may include a generative language model, such as GPT-2. In this way, the system may generate phrases including text segments and slogans for use in a target design.

At operation 715, the system retrieves images related to the phrases. In some examples, the system uses an image retrieval component to query a database including images. The queries can be based on the previously generated phrases. In some cases, the system performs MMR re-ranking on the phrases to ensure a diverse set of retrieved images.

At operation 720, the system generates image text combinations from the phrases and the retrieved images. The system may use a combination component which includes a multimodal encoder to encode the phrases and the images into a common space, such as a CLIP embedding. In some cases, each image text combination is generated by comparing the text embeddings to the image embeddings for similarity, and choosing one or more images and one or more phrases for the combination based on the comparison. In this way, the system ensures image text combinations with semantic coherence.

At operation 725, the system inserts the image text combinations into a compatible layout. This operation may use a layout retrieval component and a document generation component as described with reference to FIG. 2. In an example, the system retrieves layouts that are compatible with the image text combinations. The system may generate bounding boxes for each image and text of the image text combinations, and choose layouts that are compatible with the number and size of the bounding boxes. Then, the system generates variants of a target design document by placing the image text combinations into the retrieved layouts. In some cases, the system compares embeddings of the image text combinations with the embeddings of the layouts to choose the final design.

At operation 730, the system provides a completed graphic design document. In some cases, the system provides the design through the user interface component(s) as described with reference to FIG. 2. In at least one embodiment, the system further prompts the user to alter the final design with additional images, color palettes, and other design elements. The system may also provide the user with additional design variants to choose from.

Figure 8:
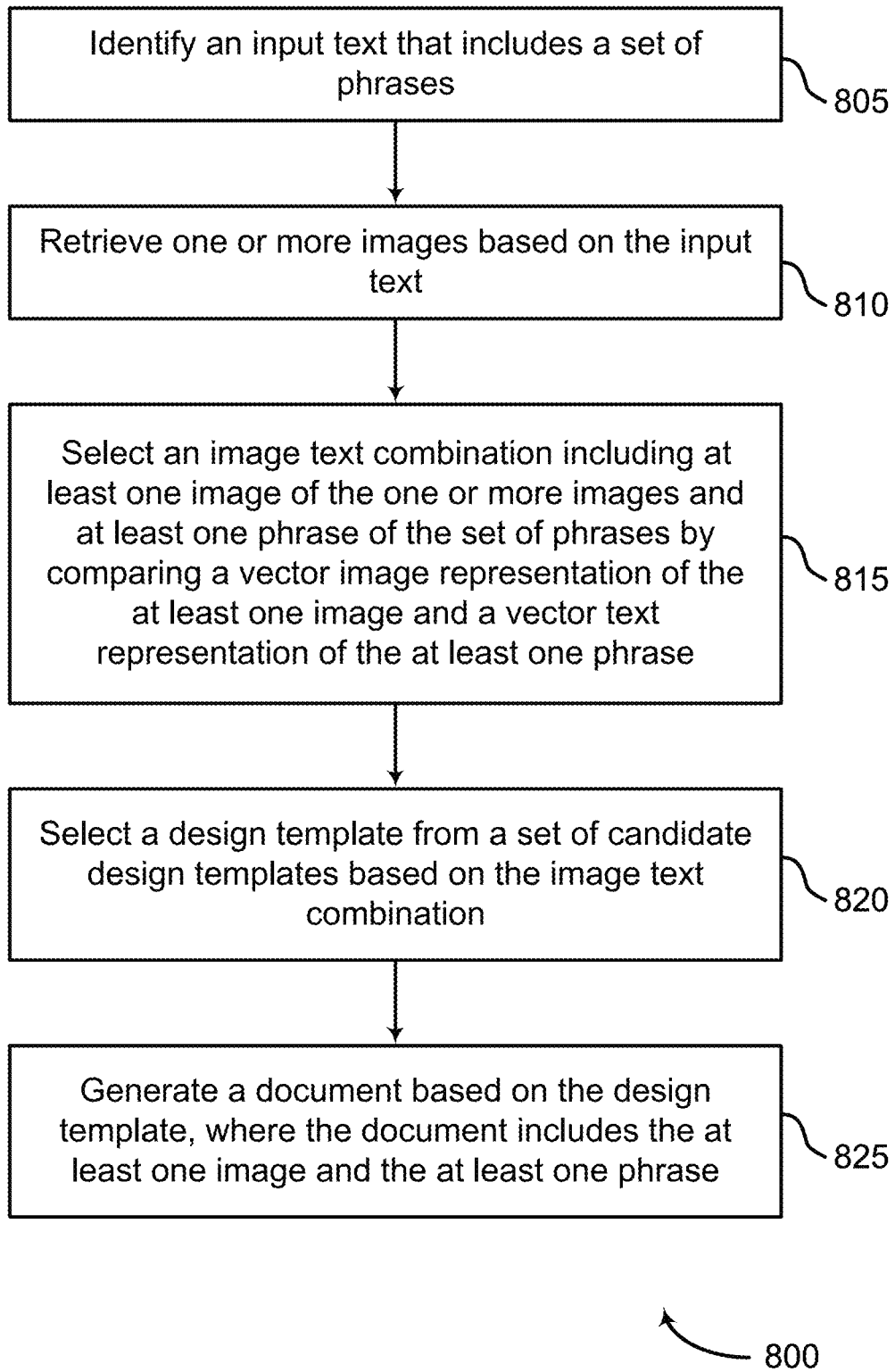
FIG. 8 shows an example of a method for generating a graphic design document according to aspects of the present disclosure.

FIG. 8 shows an example of a method 800 for generating a graphic design document according to aspects of the present disclosure. In some examples, these operations are performed by a system including a processor executing a set of codes to control functional elements of an apparatus.

Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies an input text that includes a set of phrases. The input text may be a description of an event or product, such as the input text shown in FIGS. 3-4. In some cases, the operations of this step refer to, or may be performed by, a design generation apparatus as described with reference to FIG. 1.

At operation 810, the system retrieves one or more images based on the input text. For example, the system may generate text segments and slogans using NER and NLP components, as described with reference to FIG. 3, and then query a database using the text segments or slogans. In some cases, the operations of this step refer to, or may be performed by, an image retrieval component as described with reference to FIGS. 2 and 4. The images may additionally include images provided by the user.

At operation 815, the system selects an image text combination including at least one image of the one or more images and at least one phrase of the set of phrases by comparing a vector image representation of the at least one image and a vector text representation of the at least one phrase. In some cases, the operations of this step refer to, or may be performed by, a combination component as described with reference to FIG. 2. In this example, the combination component provides two functions. The first function that the combination component provides is encoding the images and phrases into a common space, such as a CLIP embedding. The second function that the combination component provides is generating the image text combinations by determining images and phrases that are similar to each other within the common space.

At operation 820, the system selects a design template from a set of candidate design templates based on the image text combination. In some cases, the operations of this step refer to, or may be performed by, a template component as described with reference to FIG. 2. Template retrieval will be described in greater detail with reference to FIG. 9.

At operation 825, the system generates a document based on the design template, where the document includes the at least one image and the at least one phrase. In some cases, the operations of this step refer to, or may be performed by, a document generation component as described with reference to FIG. 2. In some embodiments, the system generates multiple documents to provide different design variants to a user. In at least one embodiment, the system identifies an additional image, font, or other design element, and prompts the user to update the document to include the design element.

Figure 9:
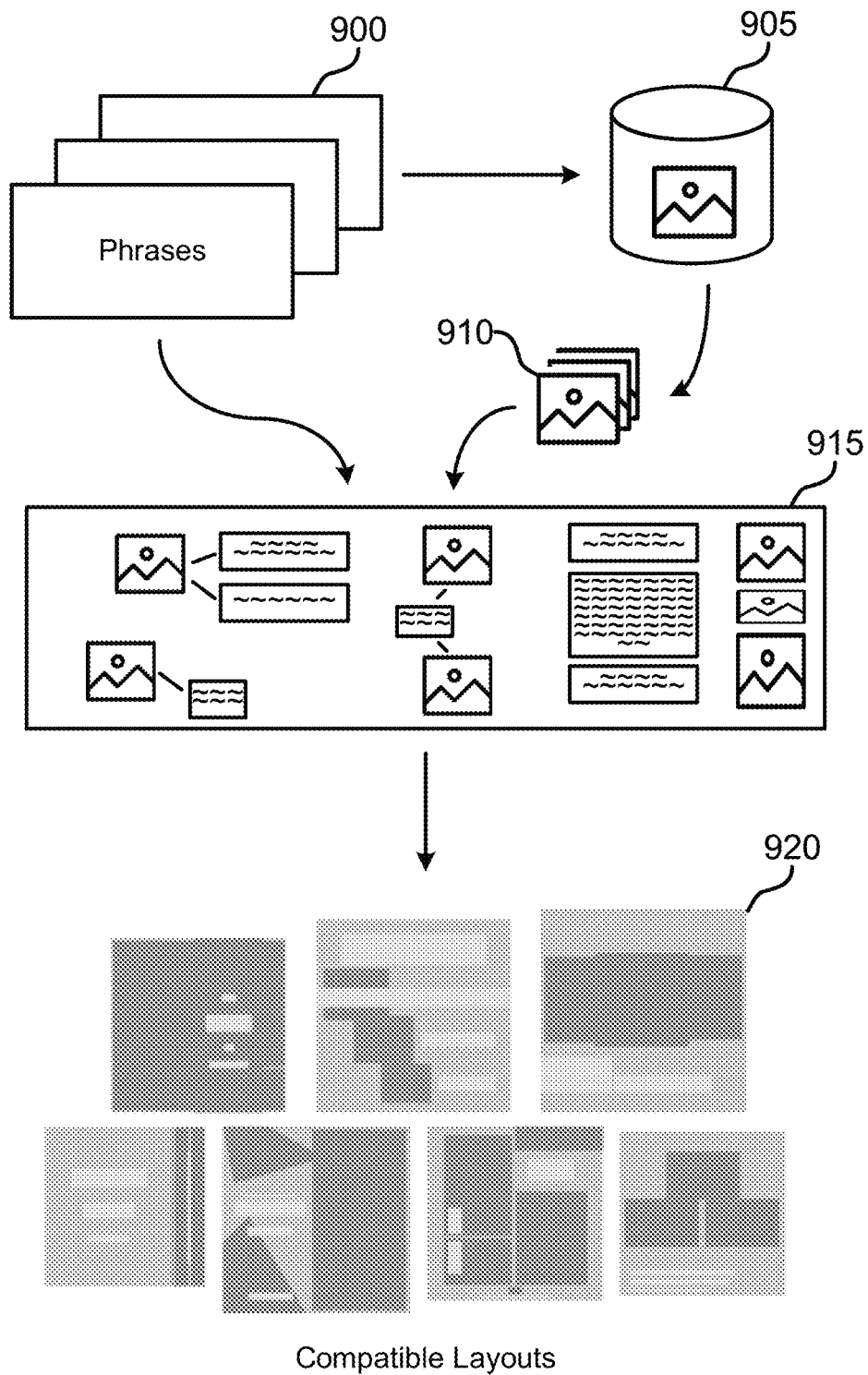
FIG. 9 shows an example of a process for selecting candidate design templates according to aspects of the present disclosure.

FIG. 9 shows an example of a process for selecting candidate design templates according to aspects of the present disclosure. The example shown includes phrases 900, database 905, images 910, image text combinations 915, and compatible design templates 820.

Phrases 900 is an example of, or includes aspects of, the corresponding element(s) described with reference to FIG. 6. Database 905 is an example of, or includes aspects of, the corresponding element described with reference to FIGS. 1 and 4. Images 910 is an example of, or includes aspects of, the corresponding element(s) described with reference to FIGS. 4 and 5. Image text combinations 915 is an example of, or includes aspects of, the corresponding element(s) described with reference to FIG. 6.

An example embodiment of the present disclosure includes a template database. The template database may be a part of an overall database 905 such as the one described with reference to FIG. 1, which includes templates, images, and other assets, or may be implemented as a separate store of data. Some embodiments of the template database include approximately 100K templates with templates or posters along with associated metadata about various components. The metadata may include sets of design components, such as fonts, logos, graphics, and the like, and may include fields in which to place text, images, and assets.

In some examples, the system uses the template database to identify an appropriate design for a given collated set of assets. Assets include phrases 900 and images 910. The generation and retrieval of the assets is described in greater detail with reference to FIGS. 3 and 4. A combination component generates image text combinations 915 from the assets. In some examples, the layouts are retrieved based on the amount and dimensions of the text and the images in the image text combinations. The layouts can be filtered depending on the number of text and image fields in the layouts. Layouts with a high number of fields are selected for inputs with a high number of assets (i.e., depending on the input). Next, embeddings (for example, CLIP embeddings) of the input images and similarity with templates in the dataset are computed (using, for example, cosine similarity), which allows for selection of templates that are semantically close to the chosen assets. In some examples, compatible design templates 920 are chosen based on the amount and dimensions of the text and the images in the image text combinations, and a final design template is chosen based on the computed similarity.

Leveraging Prior Designs

A non-transitory computer-readable medium for automatically generating designs is described. One or more aspects of the non-transitory computer-readable medium include instructions executable by a processor to: identify an input text and one or more images; identify a common element from a plurality of prior documents; select an image text combination including at least one image of the one or more images and at least one phrase of the input text by comparing a vector representation of the at least one image and a vector representation of the at least one phrase; select a design template from a plurality of candidate design templates based on the image text combination; and generate a document based on the design template, wherein the document includes the at least one image, the at least one phrase, and the common element. According to some aspects, the instructions include additional instructions executable to extract one or more common elements from the plurality of prior documents, wherein the one or more common elements comprise a text element, a logo, a color palette, a font, or any combination thereof.

In some cases, users have inspirational designs from which the users would want to import certain design attributes in the design process. For example, inspirational designs can be designs that the user saw online or prior designs that a brand has used in the past. Some embodiments of the present system allow the user to input designs and extract fonts used in posters, color themes, logos, and styles to construct a set of guidelines for target designs. Replicating an existing design for a new workflow can be difficult and time-consuming. Accordingly, embodiments of the system can store relevant units such as fonts, color palettes, and logos in the document generation pipeline. Design elements such as fonts, color palettes, and logos can constitute a large portion of the brand identity of a company, for example. Therefore, extracting these elements from prior designs enables users to automatically apply brand guidelines to designs.

Figure 10:
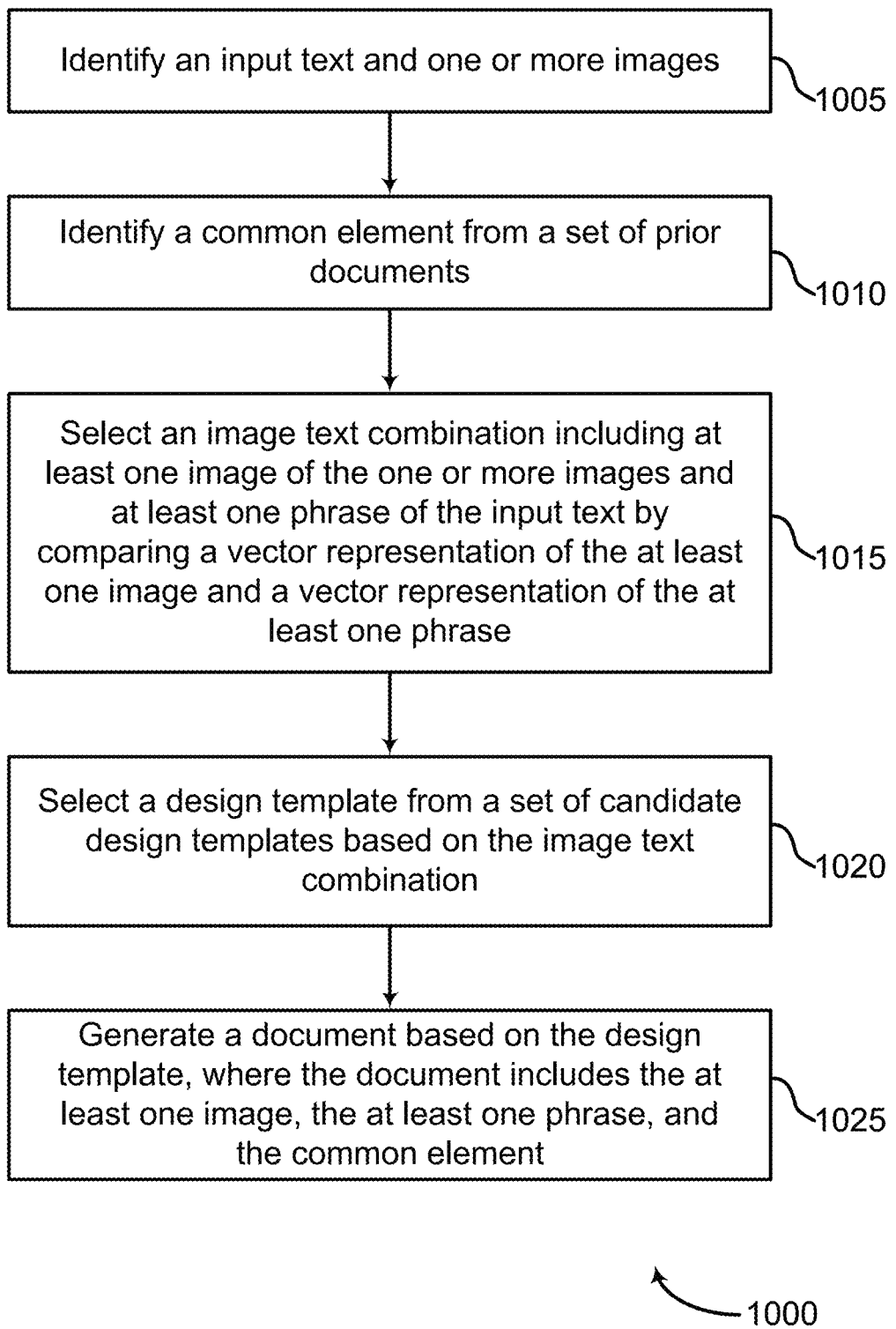
FIG. 10 shows an example of a method for generating a graphic design document based on prior designs according to aspects of the present disclosure.

FIG. 10 shows an example of a method 1000 for generating a graphic design document based on prior designs according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies an input text and one or more images. The input text may be a description of an event or product, such as the input text shown in FIGS. 3-4. In some cases, the operations of this step refer to, or may be performed by, a design generation apparatus as described with reference to FIG. 1.

At operation 1010, the system identifies a common element from a set of prior documents. In some cases, the operations of this step refer to, or may be performed by, an element extraction component as described with reference to FIGS. 2 and 11. In some examples, the common element is a logo, font, or color palette, though the present disclosure is not limited thereto. Computer vision and image processing techniques, which will be described in greater detail with reference to FIG. 11, allow the system to search for any number of common elements across prior design documents.

At operation 1015, the system selects an image text combination including at least one image of the one or more images and at least one phrase of the input text by comparing a vector representation of the at least one image and a vector representation of the at least one phrase. In some cases, the operations of this step refer to, or may be performed by, a combination component as described with reference to FIG. 2.

At operation 1020, the system selects a design template from a set of candidate design templates based on the image text combination. In some cases, the operations of this step refer to, or may be performed by, a template component as described with reference to FIG. 2. Additional detail regarding template retrieval is provided with reference to FIG. 8.

At operation 1025, the system generates a document based on the design template, where the document includes the at least one image, the at least one phrase, and the common element. In some cases, the operations of this step refer to, or may be performed by, a document generation component as described with reference to FIG. 2. In this way, the system incorporates elements from prior designs into a target design.

Figure 11:
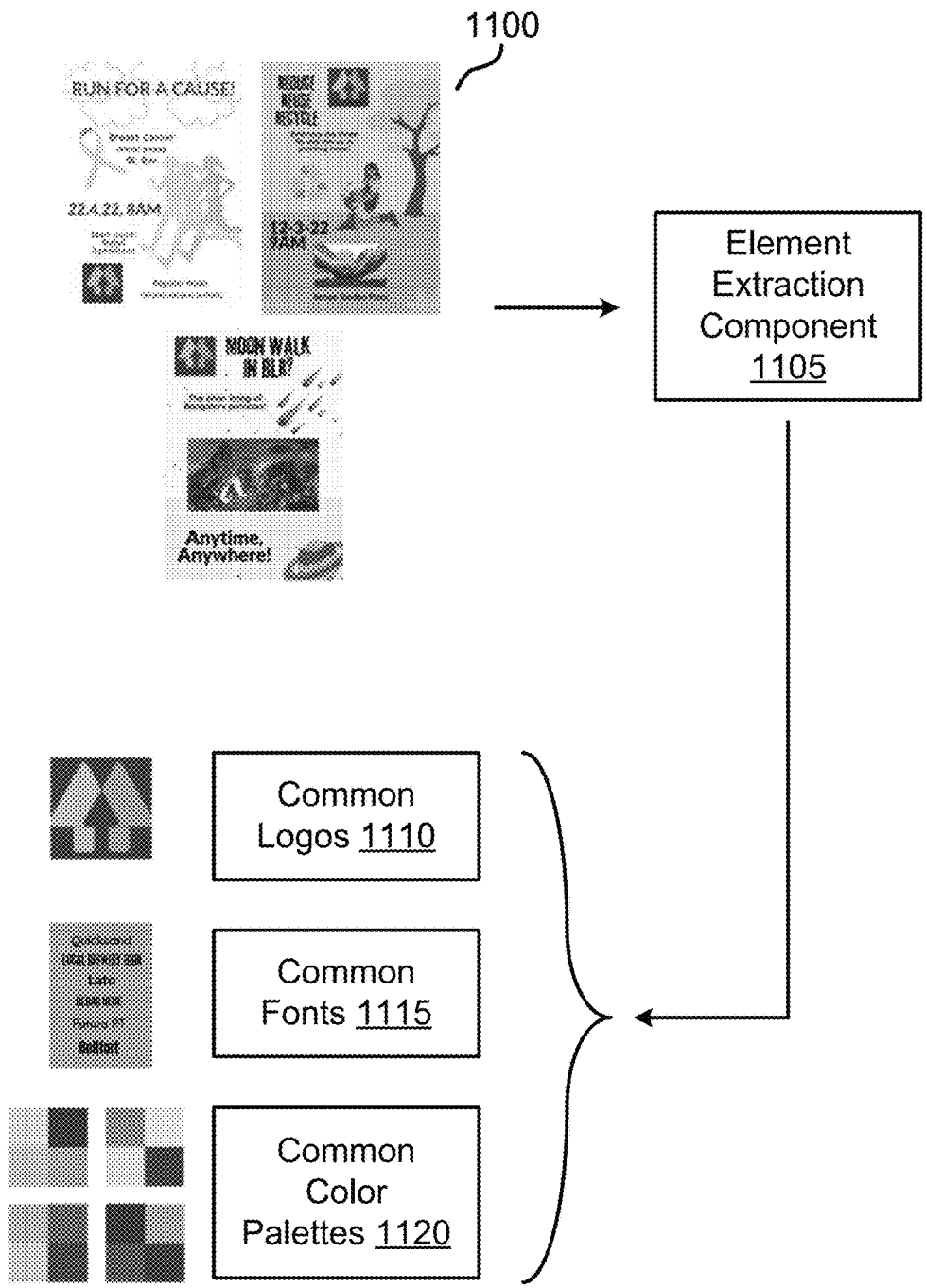
FIG. 11 shows an example of a pipeline for extracting prior designs according to aspects of the present disclosure.

FIG. 11 shows an example of a pipeline for extracting prior designs according to aspects of the present disclosure. The example shown includes prior documents 1100, element extraction component 1105, common logos 1110, common fonts 1115, and common color palettes 1020. Element extraction component 1005 is an example of, or includes aspects of, the corresponding element described with reference to FIG. 2.

Embodiments of the design generation system are configured to extract common elements such as logos, fonts, and color palettes from prior designs. The system is not limited thereto, however, and can be configured to extract other common elements such as background graphic elements, border styles, realistic and clip-art style images, and the like.

Logos are a part of an identity of a brand. Accordingly, placing logos on graphic design documents can facilitate advertising of the brand. Further, placing logos on the design document can connect the advertised product to a message conveyed by the brand. An embodiment of the present disclosure includes element extraction component 1005 configured to extract objects from the prior designs.

In some cases, element extraction component 1105 includes an object detection model to extract the common elements. Some embodiments of the object detection model use rule-based image processing techniques, and do not necessarily use trained deep-learning models. Other embodiments include deep-learning models trained on a dataset. For example, some embodiments of element extraction component 1105 include a deep-learning object detection model that has learned to accurately identify logos within an image. Some examples of a deep-learning object detection model include one-stage models such as RetinaNet or YOLO, and some examples include two- or multi-stage models such as G-RCNN.

Some embodiments iterate through the prior designs, and then identify and place bounding boxes on the regions where the model detects a logo. A pair-wise feature matching algorithm is used across the objects detected in each of the prior designs. In some examples, a scale-invariant feature transform (SIFT) may be used as the feature matching algorithm. In some examples, pairs with the most matches or a number of matches above a threshold are extracted as common logos 1110.

Fonts are another component of brand identity that establish the aesthetic of the brand and gather an audience's attention in an impactful way. In many cases, brands have a specific set of fonts used consistently across designs. Embodiments of the design generation system are configured to extract fonts that are present in prior design documents. Accordingly, some examples of element extraction component 1005 include a font neural network for font extraction. The font neural network performs text segmentation to extract text regions from the prior designs, and then classifies the text regions according to the fonts.

Some examples of element extraction component 1105 use a font neural network with a ResNet architecture pre-trained on a dataset, such as the ImageNet dataset. In some cases, the fonts that occur most frequently across the prior designs are selected as common fonts 1115.

Colors are also used by brands to help establish brand identity. The study of color theory suggests that colors can be associated with multiple emotions. For example, red can be associated with love and passion while green can be associated with nature and stability. Branding colors play a role in generating an emotional connection between a brand and a consumer. Consistent use of brand colors brings awareness and strengthens the association of a color with the brand. In many cases, color consistency can be observed across prior designs of various brands. Accordingly, element extraction component 1105 is configured to extract a set of colors, or a color palette, from the prior designs.

Some embodiments of element extraction component 1005 include color neural network, such as a CNN based model. Some embodiments of the color neural network are based on a classification model, such as VGG-16. The weighted color representations produced by the model are compared across prior designs to extract common color palettes 1120. Some embodiments of element extraction component 1105 do not rely on a deep learning network, and instead use a rule-based algorithm to extract color palettes based on image data from the prior designs. For example, the rule-based algorithm may extract colors with the highest representation in pixel space, or from the largest contiguous regions in the space, or the like.

Once extracted, common logos 1110, common fonts 1115, or common color palettes 1120 may be used in the pipeline described with reference to FIG. 5. In some cases, the common elements are collated into a common representation, such as a vector encoding, which is used by the system to influence the retrieval or the filtering of the candidate design templates. In some cases, labels associated with the common elements are compared with metadata in the candidate design templates, and the final design template is selected in part based on the comparison. In some examples, multiple target design document variants are rendered for the user using multiple design templates, and that include different combinations of the common elements.

Figure 12:
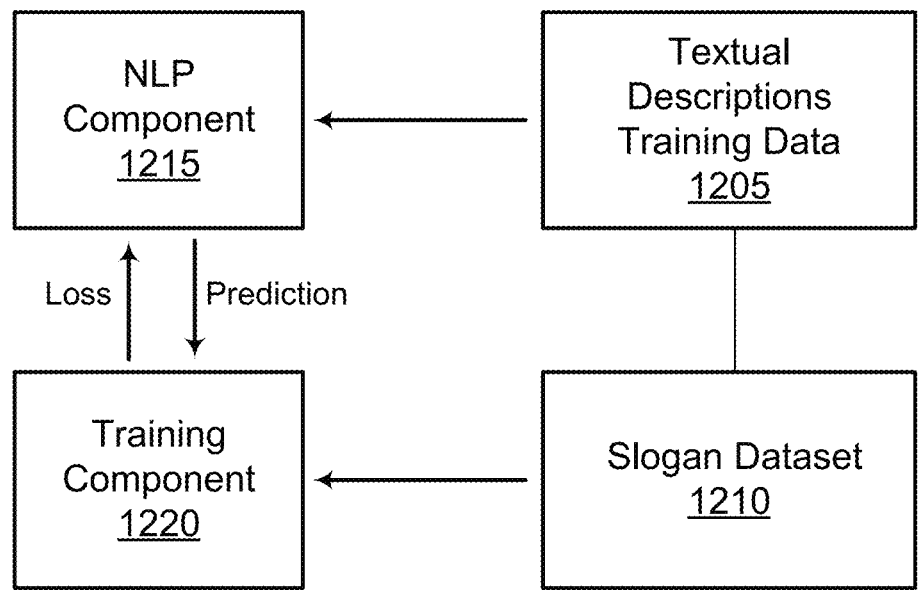
FIG. 12 shows an example of a training process for a natural language processing (NLP) model according to aspects of the present disclosure.

FIG. 12 shows an example of a training process according to aspects of the present disclosure. The example shown includes training process 1200, textual descriptions 1205, slogan dataset 1210, NLP component 1215, and training component 1220. NLP component 1215 is an example of, or includes aspects of, the corresponding element described with reference to FIGS. 2 and 3.

As discussed with reference to FIGS. 2 and 3, NLP component 1215 includes a generative language model such as GPT-2. Such generative language models can be configured for different tasks through training. NLP component 1215 includes a model which is configured to generate slogans based on a text description.

In this example, training data including textual descriptions 1205 and slogan dataset 1210 is provided to both NLP component 1215 and training component 1220. The descriptions included in textual descriptions 1205 may correspond to slogans in slogan dataset 1210. For example, the descriptions may correspond to products or events, and the slogans may include expert curated slogans for the products and events.

In an example training process, the textual descriptions 1205 are provided to NLP component 1215 including an untrained generative language model. NLP component then predicts a 'slogan', for example, a text including a constrained number of words, and provides the predicted slogan to training component 1220. Training component 1220 then receives a ground-truth slogan from slogan dataset 1210, compares it the ground truth slogan to the predicted slogan, and updates parameters of NLP component 1215. For example, training component 1220 may embed both slogans, compare the embeddings, and compute a loss term (using, for example, MSE or another error), and update parameters of NLP component 1215 based on the loss term.

Figure 13:
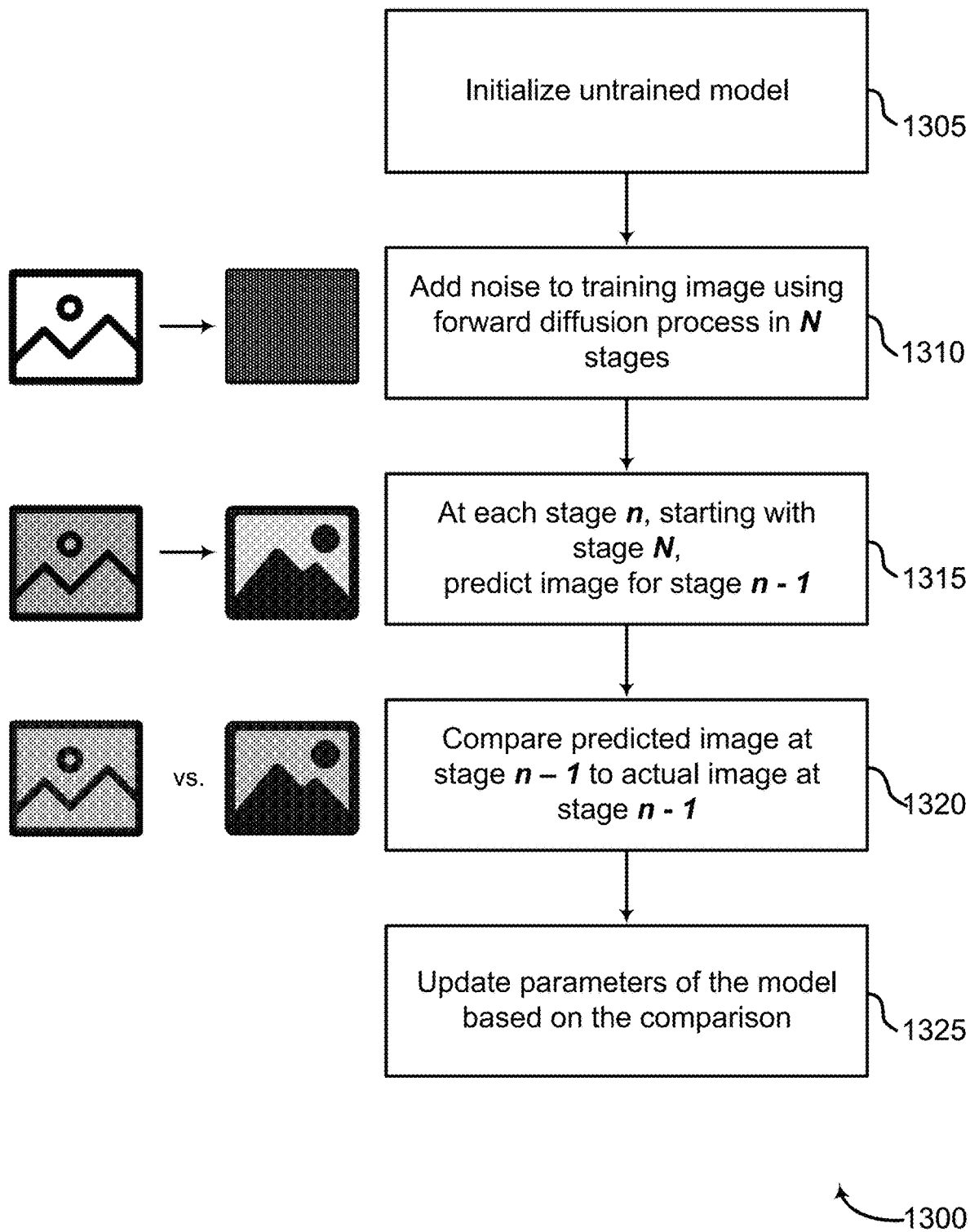
FIG. 13 shows a training process for an image generation model according to aspects of the present disclosure.

FIG. 13 shows an example of a method 1300 for training a diffusion model for image generation according to aspects of the present disclosure. The method 1300 represents an example for training a reverse diffusion process. In some examples, these operations are performed by a system including a processor executing a set of codes to control functional elements of an apparatus, such as the apparatus described in FIGS. 4 and 5.

Additionally or alternatively, certain processes of method 1300 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1310, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1315, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1320, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 1325, the system updates parameters of the model based on the comparison. For example, parameters of a U-Net may be updated using gradient descent. Time-dependent parameters of the Gaussian transitions can also be learned.

Figure 14:
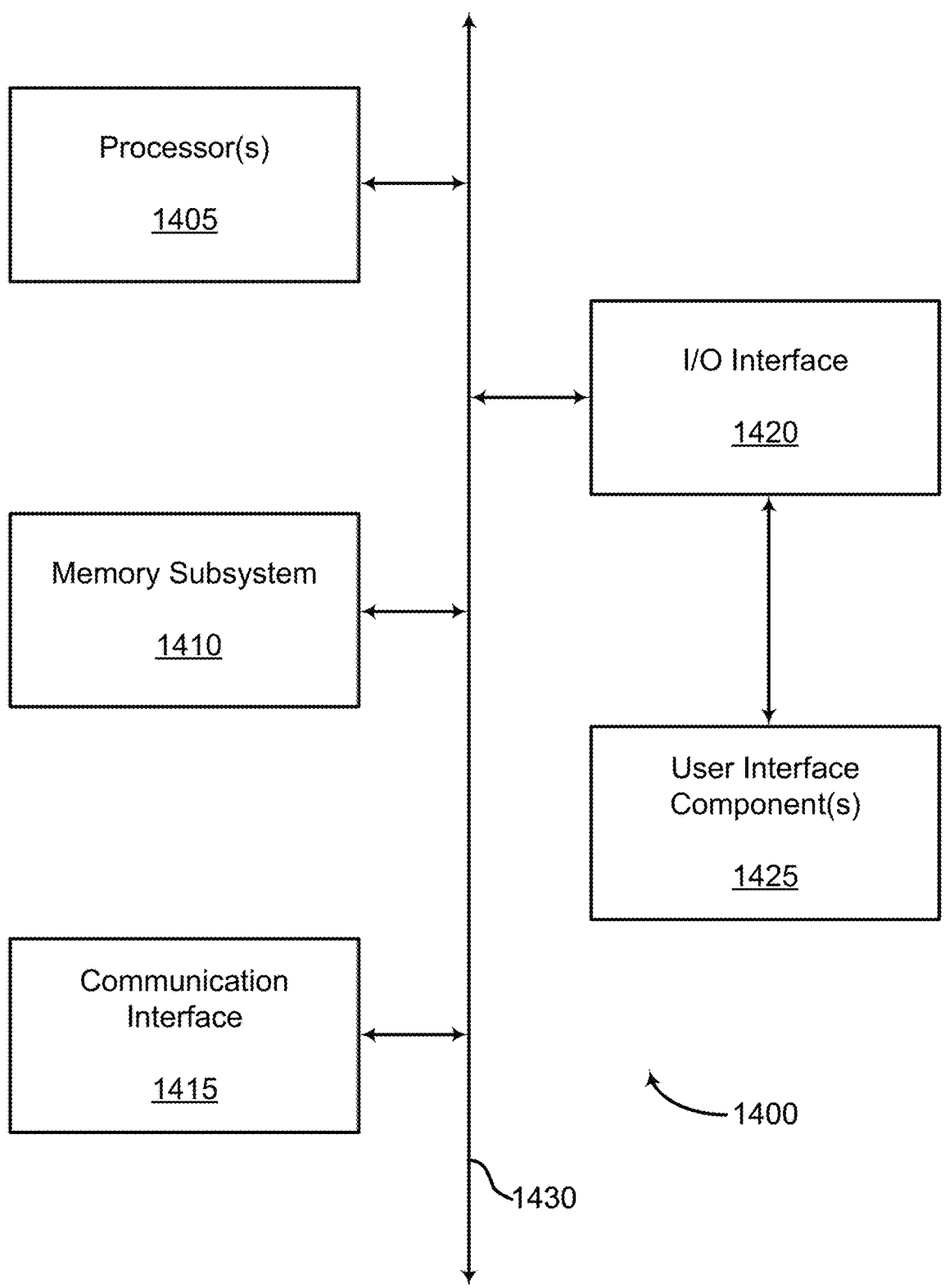
FIG. 14 shows an example of a computing device for design generation according to aspects of the present disclosure.

FIG. 14 shows an example of a computing device 1400 for design generation according to aspects of the present disclosure. The example shown includes computing device 1400, processor(s) 1405, memory subsystem 1410, communication interface 1415, I/O interface 1420, user interface component(s), and channel 1430.

In some embodiments, computing device 1400 is an example of, or includes aspects of, design generation apparatus 100 of FIG. 1. In some embodiments, computing device 1400 includes processor(s) 1405 that can execute instructions stored in memory subsystem 1410 to identify an input text that includes a plurality of phrases; retrieve one or more images based on the input text; select an image text combination including at least one image of the one or more images and at least one phrase of the plurality of phrases by comparing a vector image representation of the at least one image and a vector text representation of the at least one phrase; select a design template from a plurality of candidate design templates based on the image text combination; and generate a document based on the design template, wherein the document includes the at least one image and the at least one phrase.

According to some aspects, computing device 1400 includes processor(s) 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS @, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some aspects, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1425 include a GUI.

According to some aspects, user interface component(s) 1425 display a design document and design document variants to a user. In some examples, user interface component(s) 1425 receive an input text from a user, and optionally a set of images to be included in a target design.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data processing, comprising:
identifying an input text that includes a plurality of phrases;
generating, using a generative natural language processing (NLP) model, an additional phrase based on the input text, wherein the additional phrase is not included in the input text:
obtaining one or more images based on the input text, wherein the one or more images are compatible with the additional phrase based on a semantic coherence with the input text;
encoding an image of the one or more images in a vector space using a multimodal encoder to obtain a vector image representation;
encoding the additional phrase in the vector space using the multimodal encoder to obtain a vector text representation;
selecting an image text combination including the image and the additional phrase by comparing the vector image representation and the vector text representation;
selecting a design template from a plurality of candidate design templates based on the image text combination, wherein the design template is compatible with the additional phrase and the image;
and generating a document based on the design template, wherein the document includes the image and the additional phrase, wherein the document comprises a design based on the semantic coherence and the compatibility of the design template.

2. The method of claim 1, further comprising:
segmenting the input text to obtain the plurality of phrases.

3. The method of claim 1, further comprising:
extracting a plurality of entities from the input text using a named entity recognition (NER) model, wherein the one or more images are retrieved based on the plurality of entities.

4. The method of claim 3, further comprising:
identifying a combination of entities from the plurality of entities, wherein the one or more images are retrieved based at least in part on the combination of entities.

5. The method of claim 1, further comprising:
receiving an additional image from a user, wherein the document includes the additional image.

6. The method of claim 1, further comprising:
generating an image using an image generation model, wherein the one or more images include the generated image.

7. The method of claim 1, further comprising:
computing a similarity score for the image text combination based on the vector image representation and the vector text representation, wherein the image text combination is selected based on the similarity score.

8. The method of claim 1, further comprising:
generating a plurality of image text combinations;
computing similarity scores for each of the plurality of image text combinations, respectively; and
selecting a subset of the plurality of image text combinations based on the similarity scores.

9. The method of claim 1, further comprising:
identifying a number of images and a number of phrases in the image text combination, wherein the design template is selected based on the number of images and the number of phrases.

10. The method of claim 1, further comprising:
generating a new document based on the design template; and
inserting the image and the additional phrase into the new document to obtain the document.

11. The method of claim 1, further comprising:
displaying the document to a user;
displaying an additional content element to the user;
receiving an input from the user to replace the image or the phrase with the additional content element; and
replacing the image or the phrase with the additional content element based on the input.

12. A non-transitory computer-readable medium comprising instructions executable by a processor to:
identify an input text and one or more images;
identify a common element from a plurality of prior documents;
generating, using a generative natural language processing (NLP) model, an additional phrase based on the input text, wherein the additional phrase is not included in the input text;
select an image text combination including at least one image of the one or more images and the additional phrase by comparing a vector representation of the at least one image and a vector representation of the additional phrase, wherein the one or more images are compatible with the additional phrase based on a semantic coherence with the input text;
select a design template from a plurality of candidate design templates based on the image text combination, wherein the design template is compatible with the additional phrase and the at least one image; and
generate a document based on the design template, wherein the document includes the at least one image, the additional phrase, and the common element, wherein the document comprises a design based on the semantic coherence and the compatibility of the design template.

13. The non-transitory computer-readable medium of claim 12, wherein the instructions are further executable to:
extract one or more common elements from the plurality of prior documents, wherein the one or more common elements comprise a text element, a logo, a color palette, a font, or any combination thereof.

14. An apparatus for data processing, comprising:
one or more processors; and one or more memories storing instructions executable by the one or more processors to:
identify an input text that includes a plurality of phrases;
generate, using a generative natural language processing (NLP) model, an additional phrase based on the input text, wherein the additional phrase is not included in the input text;
retrieve, by an image retrieval component, one or more images based on the input text;
select, by a combination component, an image text combination including at least one image of the one or more images and the additional phrase by comparing a vector image representation of the at least one image and a vector text representation of the additional phrase, wherein the one or more images are compatible with the additional phrase based on a semantic coherence with the input text;
select, by a template component, a design template from a plurality of candidate design templates based on the image text combination, wherein the design template is compatible with the additional phrase and the image; and generate, by a document generation component, a document based on the design template, wherein the document includes the at least one image and the additional phrase, and wherein the document comprises a design based on the semantic coherence and compatibility of the design template.

15. The apparatus of claim 14, wherein:
the image retrieval component is configured to retrieve a plurality of images from a database based on an input text.

16. The apparatus of claim 14, wherein:
the instructions are further executable to extract a plurality of entities from an input text using a named entity recognition component (NER) component.

17. The apparatus of claim 14, wherein:
the instructions are further executable to extract one or more common elements from a plurality of prior documents using an element extraction component.

18. The apparatus of claim 14, wherein:
the combination component comprises a multimodal encoder.

* * * * *